United States Patent [19]

Fletcher et al.

[11] 3,978,410

[45] Aug. 31, 1976

[54] AIRCRAFT-MOUNTED CRASH-ACTIVATED TRANSMITTER DEVICE

[76] Inventors: James C. Fletcher, Administrator of the National Aeronautics and Space Administration, with respect to an invention of; Robert Manoli, Huntington Beach; Bertram R. Ulrich, Whittier, both of Calif.

[22] Filed: Oct. 3, 1974

[21] Appl. No.: 511,894

Related U.S. Application Data

[63] Continuation-in-part of Ser. No. 307,714, Nov. 17, 1972, abandoned, which is a continuation-in-part of Ser. No. 82,279, Oct. 20, 1970, abandoned.

[52] U.S. Cl................................ 325/114; 325/115; 325/186; 343/705
[51] Int. Cl.².......................................... H04B 1/02
[58] Field of Search .......... 325/102, 111, 112, 114, 325/115, 119, 186, 185; 343/705

[56] References Cited
UNITED STATES PATENTS

| | | | |
|---|---|---|---|
| 2,825,803 | 3/1958 | Newbrough | 325/112 |
| 3,102,982 | 9/1963 | Stypulkowski et al. | 325/112 |
| 3,174,103 | 3/1965 | Monroe | 325/111 |
| 3,335,371 | 8/1967 | Yandell | 325/115 |
| 3,553,587 | 1/1971 | Aass | 325/114 |

*Primary Examiner*—Robert L. Griffin
*Assistant Examiner*—Marc E. Bookbinder
*Attorney, Agent, or Firm*—L. D. Wofford, Jr.; G. J. Porter; John R. Manning

[57] ABSTRACT

An aircraft-crash location transmitter tuned to transmit on standard emergency frequencies is shock mounted in a sealed circular case retained in a recess atop the tail of an aircraft by means of a shear pin designed to fail under a G-loading associated with a crash situation. The antenna for the transmitter is a metallic spring-blade having a curved cross-section and coiled like a spiral spring around the outside of the circular case, the free end of the antenna abutting the surface of the recess when the case is retained therein by the shear pin for maintaining the antenna in a furled state. A battery within the case for powering the transmitter is kept trickle-charged from the electrical system of the aircraft through a break-away connector on the case that also serves to mechanically hold-open the transmitter key until the connector separates.

When a crash occurs, the resultant ejection of the case from the tail due to a failure of the shear pin releases the free end of the antenna which automatically uncoils due to its spring-like nature. The accompanying separation of the connector effects closing of the transmitter key and results in commencement of transmission. The ejected case lands with the transmitter in operation and the antenna deployed, such operation continuing until the battery is exhausted.

10 Claims, 7 Drawing Figures

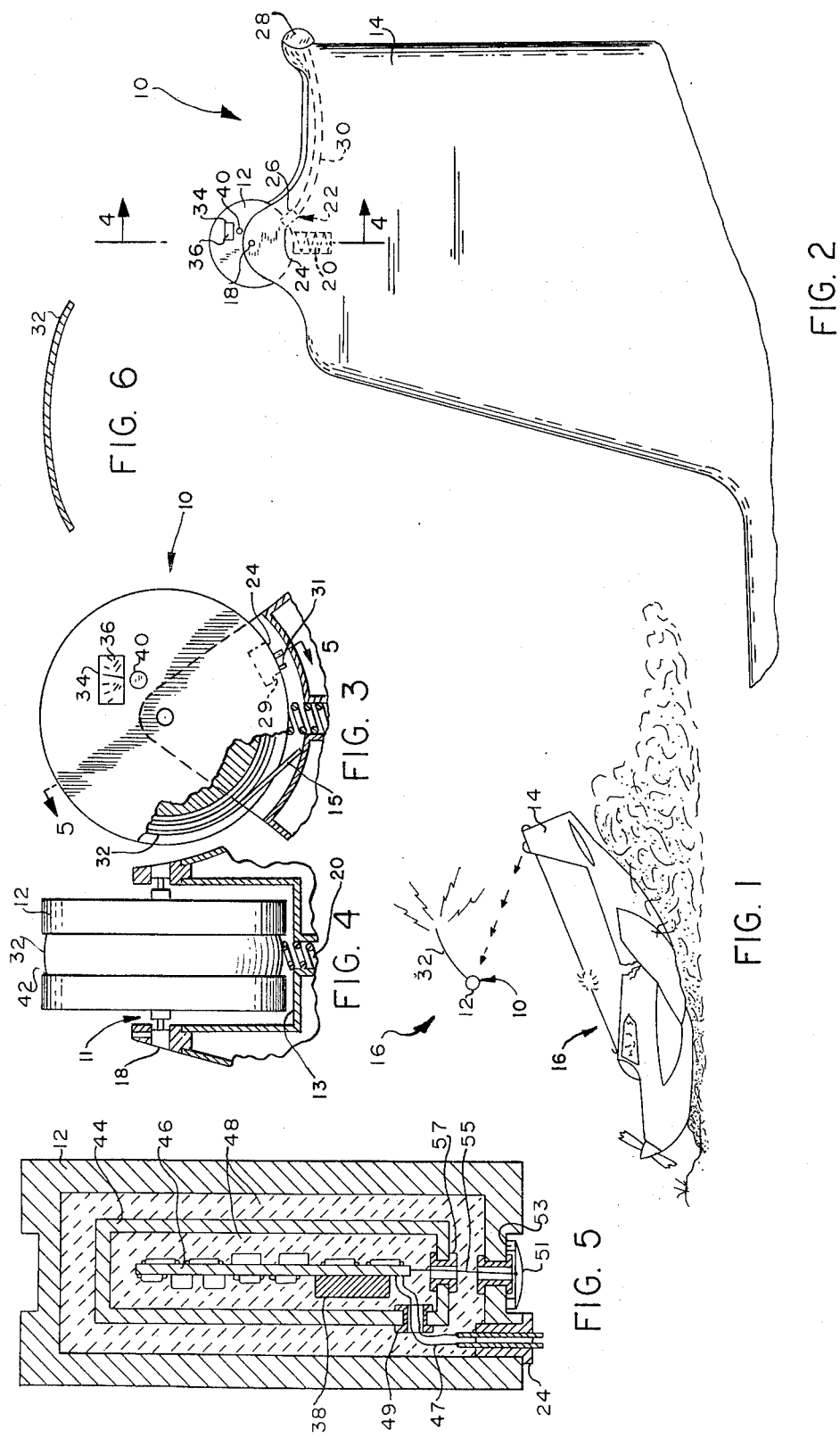

AIRCRAFT-MOUNTED CRASH-ACTIVATED TRANSMITTER DEVICE

ORIGIN OF THE INVENTION

The invention described herein was made in the performance of work under a NASA contract and is subject to the provisions of Section 305 of the National Aeronautics and Space Act of 1958, public law 85-568 (72 STAT 453; 42 U.S.C. 2457).

This application is a continuation-in-part of copending application entitled "Aircraft-Mounted Crash-Activated Radio Device", Ser. No. 307,714 filed Nov. 17, 1972 now abandoned which in turn, was a continuation-in-part of an application entitled "Aircraft-Crash Locator Apparatus", Ser. No. 82,279 filed Oct. 20, 1970 now abandoned.

BACKGROUND OF THE INVENTION

1. Field of the Invention

The invention relates to an aircraft crash location device and more particularly to an aircraft crash location transmitting device which is designed to automatically eject from an aircraft at the time of a crash and start transmitting signals automatically.

2. Description of the Prior Art

Aircraft crash locator transmitters are known in the prior art and indeed several are on the commercial market at the present time. Most of these devices are mounted on the instrument panel of an aircraft. Some are mounted on the fusilage of an aircraft and are designed to be removed manually and manually operated in the event of an accident.

Most of these prior art devices use antenna deployment techniques which are less than satisfactory. None of the prior art devices known to applicants are entirely satisfactory in their operation. Some of the antennas in these devices are complicated in their structure or operation. Some are carried in a container and may become jammed into the container by the force of a crash.

Most of the prior art devices are powered by batteries which must be replaced periodically depending upon the length of their shelf life. Also, it is difficult to check these batteries to determine when the battery has deteriorated and needs replacement.

Still other prior art devices are large and heavy and contain chokes and other heavy components normally found in standard transmitters used in applications where weight of the transmitter is of no great consequence.

SUMMARY OF THE INVENTION

Accordingly, it is an object of this invention to develop an improved airplane crash location device which transmits an emergency radio signal in the event the airplane crashes.

A further object of this invention is to develop an airplane crash location device which automatically ejects from the aircraft in the event of a crash and automatically starts transmitting an emergency radio signal from a position near the aircraft crash.

Still another object is to provide an aircraft crash location device which has an antenna which is simple and fool-proof in design and which automatically unfurls when the device is ejected from the aircraft.

Yet another object of the invention is to provide an aircraft crash location device having a battery which stays charged and which does not need periodic replacement and may easily be checked while the device is installed on the aircraft without opening the sealed case of the device.

These and other objects are accomplished in the present invention which provides a transmitter mounted in a sealed case with the case being mounted on an aircraft so that it will be released under a predetermined outside force. The device contains a metal spring-blade antenna which is wrapped around the exterior of the case and having a long life battery and resistor-capacitor time circuit using a large capacitor, all mounted inside the case and connected to the transmitter for supplying power to the transmitter.

An embodiment of the invention is illustrated in the accompanying drawings, wherein:

FIG. 1 is a pictorial view of a crash aircraft showing the ejection of a device according to the invention in response to the impact of an aircraft;

FIG. 2 is a side view of the tail section of an aircraft showing the device according to the present invention mounted on the fixed vertical section of the tail;

FIG. 3 is a front elevation view of the case of the device according to the present invention partially in section and showing the test meter and operating button, and the interaction between the free end of the antenna and the surface of the aircraft;

FIG. 4 is a view partially in section taken along the lines 4—4 of FIG. 2;

FIG. 5 is a vertical sectional view of the case taken along the line 5—5 of FIG. 3;

FIG. 6 is a greatly enlarged cross-sectional view of a portion of the antenna blade.

DESCRIPTION OF THE PREFERRED EMBODIMENT

Figure 7:
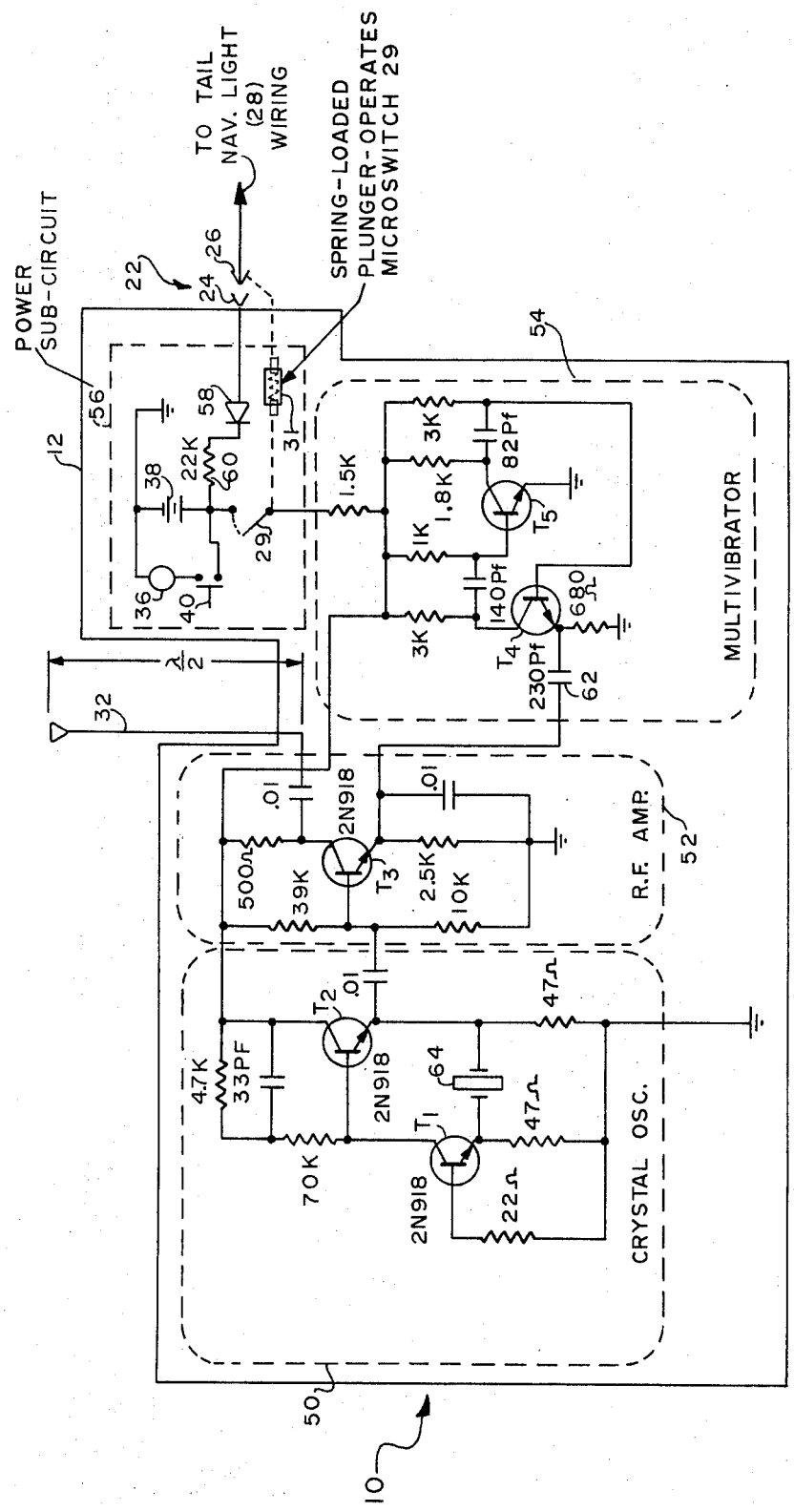
FIG. 7 is a circuit diagram of the transmitter which is part of the present invention.

Referring now to FIG. 1 of the drawing, reference numeral 10 designates an aircraft-mounted crash-activated transmitter device according to the present invention being ejected from the tail section 14 of aircraft 16 as the latter impacts the ground. Device 10 includes a radio transmitter tuned to predetermined emergency frequencies sealed in an outer circular case 12 that is releasably attached in a recess in the vertical tail section 14 of the aircraft by means of shear pin 18 having "necked-down portions" (see FIG. 4) that fail under a load of about 7–8 G's on the case effecting its ejection from the aircraft when the latter crashes. To assist in the ejection, spring 20, mounted in a tube connected with the external surface 13 of the recess 11 bears against the case 12 outwardly biasing the same against the restraining force of pin 18.

Case 12 is provided with a circumferential channel 42 for receiving antenna 32 which is in the form of a metallic spring-blade having a curved cross-section, as shown in FIG. 6, and coiled upon itself in the channel 42. Antenna 32 is thus similar in material and construction to the familiar "yo-yo" type metal retractable tape rule. The curvature of the blade adds to its rigidity and spring-back quality.

One end of antenna 32 is mechanically attached to the case 12 at mount 51 (FIG. 5) which is insulated from the outer case by stand-off insulator 53, and electrically connected to the components of circuit board 46 by antenna feeder wire 55 which passes through insulator 57 mounted in a wall of inner case 44 described in detail below. The antenna is tightly coiled about case 12 in channel 42 with the free end 15 of the antenna bearing against the external surface 13 of the aircraft thereby retaining the antenna in its furled state when the case 12 is attached by the shear pin to the tail section of the aircraft. Spring 20, which is of a size to fit within recess 11, bears against the antenna coiled within the recess, and further serves to retain the antenna tightly coiled in channel 42.

As described in detail below, a battery within the casing 12 is connected to the transmitter therein through a normally open key that is held open by the mating of sections 26 and 24 of a break-away connector 22. Section 24 of the break-away connector is connected to case 12 as shown in FIG. 5 while section 26 of the connector is attached to the surface 13 of the tail of the aircraft in a position such that the two sections 24 and 26 mate when the shear pin is in place mounting the case 12 in the recess 11. Section 26 of the break-away connector is connected by cable 30 (FIG. 2) to a voltage source in the aircraft electrical system, as for example the tail navigation light 28 of the aircraft in order to achieve trickle-charging of battery 38.

As shown schematically in FIG. 7, the transmitter is turned-on when the battery 38 is connected to the circuitry by the closing of micro switch 29 which functions as a key, such micro switch normally being held open by the engagement of section 26 with spring loaded plunger 31 (see FIG. 3) which is also a part of connector 22. Thus, the break-away connector serves to mechanically hold open the switch 29 until the case is released from the aircraft and the sections 24 and 26 separate.

Meter 36 is provided to determine the quality of the battery 38 which is inaccessable within case 12, the meter being located behind window 34 in a side wall of case 12. Immediately below the window 34 is a manually operable push button 40 accessable when the case is mounted in place on the tail of the aircraft as shown in FIG. 2. Depression of the push button 40 shunts the battery 38 with the meter, as shown in FIG. 7, allowing the quality of battery 38 to be determined without the necessity for opening case 12 or removing it from its installed position on the tail of the aircraft.

Under normal conditions, the case 12 is mounted as shown in FIGS. 2–4 with the antenna coiled around the case and shear pin 18 serving to retain the case in the recess 11 against the pressure of spring 20, the sections 24 and 26 of the break-away connector 22 being mated as shown in FIG. 2, and the spring helping to hold the antenna tightly coiled around the case.

In the event that a crash occurs, pin 18 fails and the case 12 is ejected from recess 11 by the inertia of the case due to the crash with the assistance of spring 20. Upon separation of sections 24 and 26 of break-away connector 22, plunger 31 is released allowing switch 29 to close and the transmitter to go into operation broadcasting on assigned emergency frequencies. As soon as the free end 15 of the antenna clears the exterior surface of the aircraft, the inherent spring-like nature of the antenna becomes effective to cause it to uncoil and to deploy in operative condition. The ejected case 12 thus lands adjacent the aircraft with the transmitter in operation and the antenna deployed. Operation continues until battery 38 is exhausted.

The vertical sectional view of FIG. 5 illustrates how the transmitter 10 is packaged to prevent damage when the transmitter outer metal case 12 is ejected. Inside outer case 12 the transmitter is encapsulated in a hard plastic inner case 44. Inside the inner case 44, the electronic circuit of the transmitter 10 including battery 38 is mounted in miniaturized form on circuit board 46. The space between outer case 12 and inner case 44 is filled with spray-on plastic foam 48 of a type which has been used in the design of Saturn space vehicles because it is capable of withstanding heavy G loads of 50 G's or better for at least 10 milli-seconds duration. The space between inner case 44 and circuit board 46 is also filled with spray-on plastic foam 48. Circuit board 46 is connected to external electrical connector section 24 by wiring 47 which feeds through insulator 49 mounted in the wall of inner case 44. Antenna 30 (not shown in FIG. 5) is attached to mount 51 which is insulated from outer case 12 by stand off insulators 53. Antenna 30 is connected to circuit board 46 by antenna feeder wire 55, which passes through insulator 57 mounted in the wall of inner case 44.

It should be understood that in the manufacturing of the invention, encapsulation of the device in the manner shown in FIG. 5 requires mechanical support of circuit board 46 within inner case 44 and mechanical support of inner case 44 within outer case 12 while the foam is being poured. Also, access holes are required in inner case 44 and outer case 12 during the pouring of the foam. These access holes must later be closed. For simplicity, these struts and access holes have not been shown, since these manufacturing methods are not considered part of the invention.

The concave configuration the blade of antenna 32 described above is illustrated by the greatly enlarged cross sectional view of FIG. 6.

Looking now to FIG. 7, the circuit diagram of the transmitter is designated generally at 10. Circuit 10 comprises the crystal controlled oscillator circuit 50, capacitively coupled to a radio frequency amplified stage 52 and modulated by an unbalanced multivibrator 54 (to conserve energy). When the transmitter is attached to an aircraft 16, it is powered by the aircraft's electrical system, preferably through an optional connection to the wiring leading to the tail navigational light 28, as already described above. Battery 38 is kept charged by a trickle charge circuit comprising a blocking diode 58 and a high resistance resistor 60, which may be found in the power subcircuit shown in box 56 of circuit 10. Battery 38 may also be charged by an external 12 volt battery when the transmitter outer case 12 has been removed from the aircraft 16. Removal of case 12 is accomplished by removing shear pin 18 which locks case 12 into the vertical tail section 14 of aircraft 16.

Also shown in the power subcircuit in box 56 is break-away electrical connector 22 comprising section 24 attached to the case and section 26 attached to the vertical tail section of the aircraft. When section 24 separates from section 26 spring loaded plunger 31 operates microswitch 29, which switches battery 38 into the circuit of transmitter 10 and causes transmitter 10 to start transmitting. Pushbutton 40 and meter 36, which are used to test battery 38, may also be seen in box 56.

The output frequency of the transmitter is crystal controlled and derived from the 121.5 MHz oscillator circuit 10. In this circuit, the transistor $T_1$ operates as a grounded base oscillator, the frequency of oscillation being controlled by a series resonant crystal 64. Circuit 10 is adjusted so that it emits both fundamental and second harmonic signals on the two aircraft distress frequencies 121.5 MHz and 243 MHz.

The output from the oscillator stage 50 is capacitively coupled to the base of transistor $T_3$ in the R.F. amplifier 52 operating in class A. The R.F. amplifier is also emitter driven by the multivibrator at an audio frequency, which periodically biases the transmitter off. Therefore, the transmitter does not transmit continuously. Audio pulsing allows transmitter circuit 10 to have a duty cycle 40 to 50 per cent greater than if it transmitted a continuous signal. To conserve energy the multi-vibrator is unbalanced. The on-time of transistors $T_4$ and $T_5$ is determined by the RC time constants of the base resistors and capacitors. Stability of frequency is within 0.005% in the temperature range of −40° to +55°C because of semiconductor construction. Bandwidth will not exceed 50 KHz on either 121.5 MHz or 243 MHz.

Power output is at least 75 milliwatts average effective radiated power with the minimum of a 33⅓% duty cycle. Greater power output would of course occur at 40–50% duty cycle. With the component values shown in FIG. 7, power output would not be down more than 3 db at the end of 48 hours at 70°F. or 24 hours at 32°F. If desired, a transistor capable of higher power output may be substituted for the 2N 918 shown in R.F. power amplifier circuit 52. Care must be taken in the encapsulation of the crystal 64 so that breakage will not occur. However, this can be accomplished, provided adequate packaging is used within case 12, as described above.

The foregoing discussion describes an aircraft crash location device which can be located on the vertical tail section of an aircraft where the least amount of destruction occurs in the event of a crash. The device is designed to release on initial impact, not total crash, and automatically begin transmitting distress signals on both official distress frequencies. The antenna is covered with a plastic coating approximately one mil thick to prevent electrical grounding if the antenna should touch the ground. The antenna is considered to be of a foolproof design since it is not contained in a housing where it might become jammed. The unit is contained in a sealed case, yet has convenient provisions for periodically testing the batteries while the case remains sealed and installed on the tail of the aircraft. The transmitter circuit does not operate continuously but instead uses a part-time cycle, storing power in a capacitor and releasing it as an audio pulsed signal. The circuit is light-weight and eliminates all heavy components such as chokes. Moreover, by incorporating advanced-type packaging materials and techniques, the need for parachutes, and folding legs on the case has been eliminated. The result is an aircraft crash location device incorporating a detachable transmitter which is extremely small and lightweight yet having a design which makes it virtually foolproof and damage proof in operation.

What is claimed is:

1. An aircraft-crash location transmitter device comprising
   a. a keyable radio transmitter tuned to a predetermined frequency and sealed in a circular outer case having a circumferential channel on the periphery of said outer case;
   b. means for mounting the case on an external surface of an aircraft so that under a predetermined G-load on the case it will be released from the aircraft;
   c. an antenna having one end attached to the case and electrically connected to the transmitter, the antenna being a metallic spring-blade having a curved cross-section and coiled upon itself in spiral fashion in the channel;
   d. a battery within the case connected to the transmitter through a normally open key; and
   e. a break-away connector mounted on the case for supplying a trickle-charge to the battery from the aircraft electrical system and mechanically holding open the key until the case is released from the aircraft.

2. An aircraft-crash location transmitter device according to claim 1 wherein the free end of said antenna abuts said exterior surface of the aircraft when said case is mounted on said aircraft.

3. An aircraft-crash location transmitter device according to claim 1 including a test meter with a transparent window mounted in the wall of said sealed outer case, for monitoring the condition of said battery while said outer case is mounted on the aircraft.

4. An aircraft-crash location transmitter device according to claim 3 including a manually-operable pushbutton mounted in the wall of said sealed case and accessible from the exterior of the case, said pushbutton being serially connected with said battery and said test meter for selectively shunting the test meter with the battery to test the condition thereof.

5. An aircraft-crash location transmitter device according to claim 1 wherein the means for mounting the circular case comprises a shear pin designed to fail when a predetermined force is applied to the case, and a spring mounted in a recess in a surface of the aircraft for biasing the case against the restraining action of the shear pin.

6. An aircraft-crash location transmitter device according to claim 5 wherein the spring has a free end that fits within the channel and bears against the antenna for retaining said antenna coiled upon itself in the channel.

7. An aircraft-crash location transmitter device according to claim 5 comprising:
   a. an inner case mounted within said outer case so as to allow space between said outer and inner cases;
   b. a circuit board mounted within said inner case so as to allow space between said circuit board and said inner case, said transmitter and said battery being mounted on said circuit board; and
   c. plastic foam insulation filling said space between said circuit board and said inner case and said space between said outer and inner cases.

8. An aircraft-crash location transmitter device according to claim 7 wherein the circuit for said transmitter comprises:
   a. a crystal controlled oscillator;
   b. a radio frequency amplifier driven by said oscillator and connected to said antenna;
   c. a free-running multivibrator for periodically connecting and disconnecting the battery to the oscillator and to the amplifier at an audio frequency when said key is closed; and
   d. a trickle charger circuit connected to said battery, said trickle charger connected through the break-away connector to the electrical system of the aircraft on which said outer case is mounted.

9. An aircraft-crash location transmitter device according to claim 8 wherein the break-away connector comprises a first section mounted in the surface of said outer case and connected to said trickle charger circuit, and a second section mounted on the exterior surface of the aircraft and connected to the electrical system thereof.

10. In combination with the exterior surface of an aircraft having a recess, an improved aircraft-crash location device, comprising:
 a. a radio transmitter having a sealed cylindrical housing forming an outer case with a circumferential channel on the periphery of said case;
 b. means releasably securing said case on said aircraft in said recess;
 c. an antenna having one end connected to said radio transmitter;
 d. said antenna being an elongated concave-formed metal blade with spring-back quality wrapped around said case within said circumferential channel, the opposite end of said antenna abutting the surface of said aircraft in said recess; and
 e. said antenna being capable of unfurling itself helically by springing outwardly and unwinding itself from the circumferential channel of said case when said case is released from said recess.

* * * * *